United States Patent [19]
Soul

[11] 3,743,397
[45] July 3, 1973

[54] OPTICAL AND MAGNETIC READER FOR FILM EDITING MACHINES

[76] Inventor: Walter F. Soul, 10354 McBroom St., Sunland, Calif. 91040

[22] Filed: Feb. 28, 1972

[21] Appl. No.: 229,950

[52] U.S. Cl. ............................................. 352/129
[51] Int. Cl. ......................................... G03b 21/00
[58] Field of Search .................... 352/6, 7, 8, 9, 10, 352/29, 31, 129

[56] References Cited
UNITED STATES PATENTS

| | | | |
|---|---|---|---|
| 3,602,606 | 8/1971 | Rigby | 352/129 X |
| 3,591,267 | 7/1971 | Kakiuchi et al. | 352/29 |
| 2,322,369 | 6/1943 | Lackoff et al. | 352/10 |

*Primary Examiner*—Samuel S. Matthews
*Assistant Examiner*—Michael L. Gellner
*Attorney*—I. Morley Drucker

[57] ABSTRACT

A film editor with picture viewer, amplifier and speaker for synchronized viewing of film and auditing of sound track, by means of a motor driven synchronizer, provided with four gangs, each receiving picture and sound track via viewer and magnetic sound heads. The fourth of said gangs is provided with both an optical sound reader and a magnetic sound playback unit for reading of the audio stripe of single system film optically or magnetically.

The top portion of the optical reader contains a solar cell removable from its base portion. The base portion incorporates an optical lamp and focusing lens system which remains in precise alignment regardless of whether or not the upper portion of the optical sound reader is to be removed. The magnetic sound playback unit is adjustably mounted in a pivoting arm for precise adaptation to a sound track or complete removal therefrom when not utilized.

11 Claims, 7 Drawing Figures

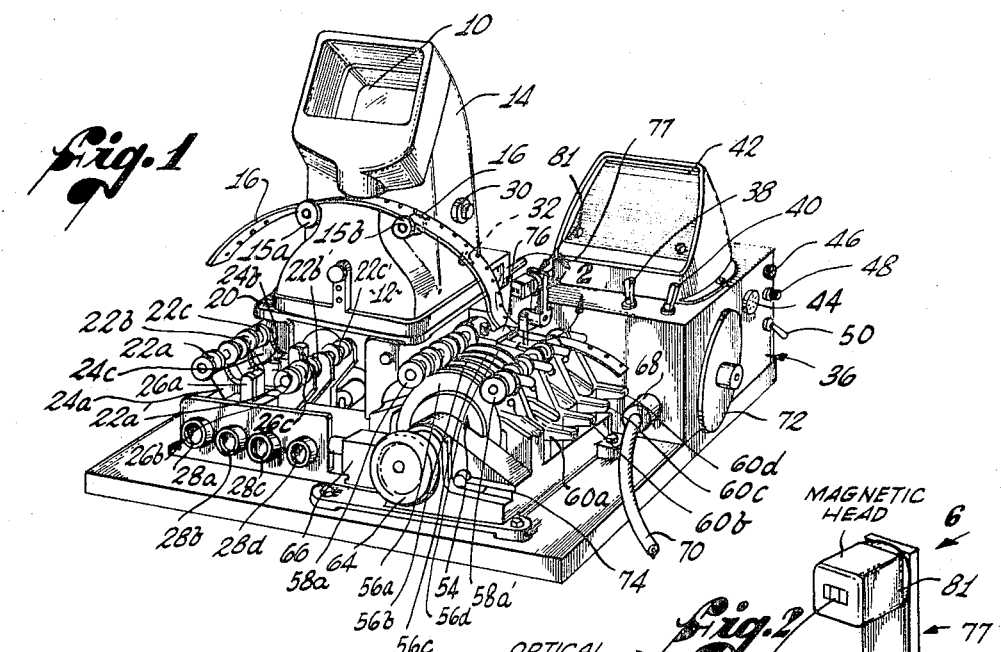

OPTICAL AND MAGNETIC READER FOR FILM EDITING MACHINES

BACKGROUND OF THE INVENTION

This invention relates to editing machines used primarily in 16 mm. film editing, permitting the simultaneous running of picture and sound tracks, on either double or single system film, which will enable the film editor to revise and decide what parts of the picture or sound track he will use. Double system film refers to film having the picture track separated from the sound track. Single system film refers to film having the visual portion or picture of the films well as either a magnetic sound strip (mag-stripe) or optical sound track running alongside of the picture track. It is standard practice for the mag-stripe to be exactly 28 frames in advance of the picture frame to which it pertains, and for the optical sound frame to be exactly 26 frame in advance of the picture frame to which it pertains.

The applicant calls attention to the following prior U.S. Pats: Casey, No. 3,196,215; Baumbach, No. 3,374,723; O'Donnell, No. 3,520,596; Nicosia, No. 3,305,296.

Casey discloses a transducer with locking means.

Baumbach reveals a film viewing system in which a light source and photoelectric cell are laterally movable.

O'Donnell shows a photoelectric cell which is aligned with an aperture and lamp.

Nicosia incorporates a photocell and a magnetic transducer in a motion picture projector.

However, none of the above listed references contemplates an optical sound reader, with the precise arrangement of components as disclosed here, permitting detachment of the top portion of the optical reader (containing a power generating cell, e.g., a solar cell) while leaving the bottom portion thereof, containing a lamp and focusing lens system or slit in precise position in the editor. Nor do the cited references contemplate a spatially simultaneous accommodation of both optical sound and magnetic sound readers (hereinafter referred to simply as optical or magnetic readers or reading systems) in the film editor.

SUMMARY OF THE INVENTION

This invention relates to a motor driven, synchronously operated, film editor for editing of either single or double film systems. The simultaneous, spatial, accommodation of both an optical reader and a magnetic playback unit adjacent to one particular film gang of a film editor, enables editing of single system film, whether the sound need be read and edited optically or magnetically. In practice, sound is recorded both optically and magnetically and thus both reading and editing systems should be readily available, and be utilizable on a readily alternate basis. More precisely, this is accomplished by a compact and special arrangement of the optical reader which, subsequent to removal of a portion thereof for a variety of reasons, e.g., to make film access easier when only mag-stripe reading is necessary, does not necessitate any repositioning or realignment of the focusing lens and slit of the optical reader when said removable portion is attached for reuse. Also, the magnetic reader is pivotally mounted so as to be clear of the film path when not in use.

In general, this invention provides a simplified and less costly design of an editing machine incorporating means for professional film editing and pre-mixing capabilities into a compact and portable unit.

Another object of the invention is to precisely locate the magnetic strip playback head in a multiple adjustable position at a location that will allow the playback head to be accurately aligned with the mag-stripe or be completely removed therefrom (when not in use) in combination with the optical reader system aforedescribed.

This invention also comprises new details of construction and novel combinations and arrangements of parts, which will more fully appear in the course of the following description which by way of illustration only is based on the accompanying drawing.

DESCRIPTION OF THE DRAWINGS

In the drawings, like reference characters designate similar parts in the several views.

FIG. 1 is a perspective view of the complete editing machine.

FIG. 2 is an enlarged perspective view of the magnetic and optical readers mounted on the editor, showing the magnetic playback arm in a vertical (non-operative) position and the optical reader in an exploded state, with the top portion thereof removed from the bottom portion of said optical reader.

FIG. 3 is a fragmentary elevational view of the optical and magnetic readers shown in FIG. 2 along the direction of the arrow designated by the numeral 3 but with the optical reader in its normal assembled state.

FIG. 4 is a fragmentary plan view of a portion of said optical and magnetic readers, taken along the line 4—4 of FIG. 3, but with the magnetic readers, taken along the line 4—4 of FIG. 3, but with the magnetic playback head shown in reading position.

FIG. 5 is a sectional view of the upper portion of the optical reader unit with a solar cell wired to an electrical contact, and taken along the line 5—5 of FIG. 2.

FIG. 6 is a rear elevational view of a portion of the head of the magnetic reader taken along the direction of the line designated by the numeral 6.

FIG. 7 is sectional view in detail of the magnetic head with adjustment means, taken on line 7—7 of FIG. 6.

DESCRIPTION OF THE INVENTION

Referring to FIG. 1, a picture viewer 10 and amplifier 12 are accommodated within a common housing 14 and are operable by way of a conventional power supply (not shown). Two guide rollers 15a and 15b, are manually rotatable for guiding of a film track 16 via these rollers through the lens system of the viewer 10 in a conventional manner.

The housing 14 is mounted on a platform 20 for laterally slidable movement with respect to the film travel and may thus be conveniently aligned with any gang or track (to be described) that may be used in conjunction with the editing of a film track.

In substantially the same horizontal plane as the platform 20 are three pairs of two rollers, each of the rollers being designated by the numerals 22a, 22a' and 22b, 22b' and 22c, 22c'. Each of the pairs of rollers are rotatably mounted on arms 24a, 24b, and 24c, respectively. Between each pair of rollers and in alignment therewith are placed three magnetic readout heads 6a, 26b, 26c, respectively operable by conventional power supply (not shown), over which the sound tracks (not shown) of double system film are guided for synchronous reading with a picture.

Four rotatable control knobs 28a, 28b, 28c, or 28d are mounted below and in front of the rollers 22a–c' and represent the external portion of four mixer controls, which operable by power supply (not shown) achieve by conventional means, a variety of different juxtopositions of speech, music and other effects with the picture.

Situated at one side of the housing 14 is a fuse 30 and switch 32, the latter switching on the viewer 10.

A synchronous motor for moving gangs or tracks at a fixed rate, e.g., 24 frames per second, is accommodated within a housing 36. A three-position switch 38 is mounted on the front portion of the top of motor housing 36 adjacent another forward-backward reversible switch 40, the purposes of which will be explained hereafter.

The speaker 42, fixedly located on top of motor housing 36 is actuated, in a conventional manner, by electric signals fed from amplifier 12. On the back of the motor housing 36 there is provided a jack (not shown on the drawing), for the plug-in of earphones eliminating the use of speaker 42.

On the right-hand side of housing 36 there is provided an electric power input socket 44 with pilot light 46, fuse 48 and switch 50 for operation of optional power reel take-up equipment.

A conventional synchronizer 54 is coupled to the synchronous motor 34 contained within housing 36 and mounted to the synchronizer 54 are four tracks or gangs 56a, 56b, 56c, and 56d for the synchronous editing and mixing of one to three double system magnetic tracks in combination with a picture film track, or the synchronizer 54 may be used with gang56d to play single system optical or magnetic stripe sound tracks synchronously with the picture film tracks will be described.

Four pairs of rollers 58a, 58a', 58b, 58b', 58c, 58c', 58d, 58d' are situated on each of said four gangs 56a–d, each pair of rollers being mounted rotatably on the upper portion of each of four curved arms, respectively (not shown). Each of said curved arms is pivotally mounted so as to swing the rollers 58a–d' clear of the gangs by depressing individual levers 60a–d which are operatively connected to said curved arms. The rollers 58a–d' serve, mainly, to accurately guide the film and sound strips along the gangs 56a–d.

A wheel 64 is mounted at one end of the synchronizer 54 and manually operates the gangs 56a–d to allow the movement of one or several film frames at a time. Adjacent wheel 64, there is disposed a braking lever 74, applied as a braking means for synchronizer motor 34.

Adjacent one end of the synchronizer 54 there is mounted a digit counter 66 for film footage.

Electrical power is provided to the synchronous motor 34 by plug means 68 with cable 70 leading to a foot pedal, (not shown). Plug outlet 68 is mounted at the front of motor housing 36. The depressing of the foot pedal triggers a clutch which engages the synchronizer 54 with the synchronizer of motor housing 36 for take-up of the film.

With reference to FIGS. 2, 3 and 4, an optical reader 76 is mounted adjacent the fourth gang 56d of synchronizer 54, and consists of two parts, a base portion 78 fixedly attached in front of and flush with said fourth gang 56d and a removable top portion 86. The base portion 78 contains a suitably powered lamp 80 mounted below a conventional focusing lens system or focusing lens slit 82 and a fixed electrical contact 84 (see FIG. 3). The top portion 86 of the optical reader 76 incorporates a solar cell (or photocell) 88 and a contact 90 which plugs into contact 84 for its power supply, and is provided with externally projecting holding means for its handling and removal from the base portion 78.

The upper portion 86 of the optical reader is held securely to the base portion 78 by means of a screw 92. The rod-like projection 94 on the upper portion 86 acts as a handle to facilitate assembly, and removal of, said upper portion 86 with said base portion 78.

A magnetic strip reader 77 is mounted, behind the fourth gang 56d, to an upright standard 57b, by means of a pivot rod 59. Standard 57b is, in turn, affixed to a base support 57a. The arm 79 of the magnetic strip reader 77 is pivotally mounted about axis x—x for lateral movement with respect to the direction of film travel and carries a magnetic playback head 81 suitably connected to conventional electrical input means. The playback head 81 is adjustable for precise positioning on the magnetic stripe portion of the film 16 on gang 56d and for precise alignment with magnetic readout head 98. Because the arm 79 is pivotally mounted about axis x—x for lateral movement with respect to the direction of film travel it is readily moved out of the way of film travel when not in use.

The magnetic playback head 81 is mounted for precise adjustment with respect to the sound stripe by means of main adjustment screw 89, and fine adjustment screws 90, 91, 92 and 93. In order to achieve precise adjustment of the head 81, the main screw 89 is first loosened, and the four fine adjustment screws are turned to effect movement of the head 81 up, down, to the left or to the right. After the precise alignment of head 81 is thus attained, the main screw 89 may be tightened.

In order to operate the single system optical reader 76, the picture viewer 10 is first moved backwards, out of the path of synchronizer 54. The optical lamp 80 is then switched on by a switch (not shown). The single system film 16, with an optical track, is threaded onto the fourth gang 56d beneath the optical readout 92 of optical reader 76. The viewer 10 is then slid forward to a stop at the fourth gang 56d on which the optical reader 76 is located and the film 16 is threaded through the viewer 10.

Because the upper portion 86 of the optical reader 76 is readily removed from the base portion without altering the precise adjustment of the focusing lens and slit 82, it is preferred to remove the upper portion 86 when magnetic sound striping is to be read. In this way, the single system film need not be threaded through between the upper and base portions of the optical reader 76 and yet no realignment of the optical reader is necessary when an optical track is to be read.

In order to operate the single system mag-stripe reader 77, the viewer is backed off clear of the way of the synchronizer. The optical lamp 80 is switched off; the picture with mag stripe sound is threaded onto the fourth gang 56d of synchronizer. The mag-stripe playback head 81 is pivoted downwardly and adjusted until reaching proper contact with the magnetic stripe of the film 16. The viewer 10 is then moved forward to a stop at the fourth gang 56d of the synchronizer 54, and the picture is threaded through the viewer 10. When the mag-stripe head 81 is not used, it is pivoted rearwardly to its vertical position.

In order to edit a double system sound track and a picture, the picture portion of the film 16 is threaded through the picture viewer 10 and the sound tracks are threaded onto one or more of the gangs 56b, 56c or 56d. The magnetic sound tracks are played on gangs 56a, 56b and 56c of synchronizer 54 via the magnetic heads 26a, 26b, 26c.

When the four rotatable knobs 28a, 28b, 28c, 28d are turned clockwise to full volume, the amplifier 12 will then control the master volume. The volume control knob 27 of the amplifier 12 is then rotated clockwise for the desired amount of volume. Mixing of the sound tracks is accomplished by lowering the individual mixer controls 28a, 28b, 28c, 28d.

For intermittent operation of the unit for either single system film or double system film, the three position switch 38 is set of a first position, designated as a "pedal" position and two position switch 40 is placed on "forward." When the foot pedal is depressed the picture is pulled through the viewer 10 and the sound track(s) run over the magnetic heads 26a, 26b, 26c (or 98) at sound speed, by means of the motor 34 driving synchronizer 54.

Where setting switch 38 on its "third" position marked "flange" and switch 40 in "forward," the film to be stripped may be wound on the hub of stripping flange 72 mounted at the side of motor housing 38, thus enabling the operator to eliminate the running of synchronizer 54. The winding of the film on the stripping flange 72 is carried out by guiding the film manually at the same time engaging the foot pedal until the winding process has been completed.

In setting switch 28 on its "constant" position it is possible to effect a constant motor run of the machine without the use of the foot pedal.

While the foregoing has illustrated and described what is now contemplated to be the best mode of carrying out the invention, the constructions are, of course, subject to modifications without departing from the spirit and scope of the invention. The invention is, therefore, intended to cover all modifications that may fall within the scope of the appended claims.

I claim:

1. In a film editing apparatus having a plurality of gangs mounted on a synchronizer for single and double system film with sound and picture tracks and having a film picture viewer through which single system sound and picture film passes onto one of said gangs, the improvement of which comprises:
   an optical sound readout system located in a separable housing adjacent said synchronizer gang comprising a lamp, focusing lens slit, and solar cell, and means for establishing electric contact between said solar cell and said lamp, said focusing lens slit and lamp being stable mounted in a first unit of said housing adjacent said synchronizer gang, and said solar cell being mounted in a second unit of said housing, said second unit being adapted to be engaged with said first unit when in use, and to be readily disengaged therefrom without altering the position of said focusing lens slit.

2. Said film editing apparatus of claim 1 which comprises, in combination the additional improvement, of a magnetic readout and playback system located adjacent said synchronizer gang comprising a magnetic sound playback means, having an adjustably magnetic sound playback head mounted thereon, said sound playback means being pivotally mounted on a standard so as to be located precisely over said sound track of said film when in use and to be disengaged from said sound track when not in use.

3. In a film editing apparatus, as recited in claim 2, in which the optical readout system and the magnetic playback system are accommodated adjacent and operable optionally on the same gang of the synchronizer.

4. In said film editing apparatus of claim 1, wherein additional gangs are provided on said synchronizer for double system film.

5. In a film editing apparatus of claim 4 wherein the picture viewer is mounted adjustably slidable on a platform to align itself with a plurality of gangs on the synchronizer for optical sound playback of single or double system films.

6. In a film editing apparatus, as recited in claim 1, in which said synchronizer gang is actuated by a normally operated foot pedal by way of a synchronous motor.

7. In a film editing machine:
   a platform;
   a housing means slidably arranged on said platform;
   a viewer for the viewing of picture tracks of a film accommodated in said housing means;
   power supply means for operating the viewer;
   an amplifier arranged in said housing means;
   magnetic heads arranged adjacent the housing means for playback of double system sound strips thereon;
   guiding means situated adjacent the magnet heads for guiding of sound tracks of the film over said magnetic heads;
   mixing control means for playback of sound tracks over the magnetic heads arranged in front of said guiding means;
   power supply means for operating the amplifier, mixing control means, and magnetic heads;
   a speaker arranged adjacent and receiving signals from the amplifier for sound production from the playback of the magnetic heads;
   a housing arranged below the speaker;
   a motor accommodated within said housing;
   a synchronizer arranged adjacent and actuated by the motor;
   a plurality of gangs, accommodated in and actuated by the synchronizer for the synchronous transport of picture and sound tracks;
   guide roller pairs, mounted adjacent each of the gangs to facilitate the transport of said film and sound tracks;
   optical sound reading means for receiving a playback of single system film tracks, said optical sound reading means being mounted adjacent one of the gangs, said optical reading means comprising a top and bottom portion, the top portion of which contains a power supplying solar call, and its bottom portion holding a focusing slit and optical lighting means; and
   magnetic sound playback means for single system film tracks, the magnetic playback means being arranged adjacent said same gangs as said optical reading means.

8. In a film editing machine, as recited in claim 7 in which the viewer is mounted adjustably slidable on a platform to align itself with a plurality of gangs of the synchronizer for optical playback of single or double system films.

9. In a film editing machine, as recited in claim 7 in which the top portion of the optical reading means is dismountable from the bottom portion thereof, without disrupting the set alignment of said remaining bottom portion.

10. In a film editing machine, as recited in claim 9, in which said top portion of the optical reading means is provided with externally projecting holding means for handling and removal of said upper portion from its base portion.

11. In a film editing machine, as recited in claim 7, in which the magnetic playback means is mounted adjustably on a pivoting arm arranged on a standard adjacent one of the gangs, for accurate positioning of the magnetic playback means on the sound track to be read while moving over one of said gangs and for its subsequent removal therefrom when not in use.

* * * * *